E. BIVERT.
AUXILIARY MARINE MOTOR.
APPLICATION FILED JAN. 24, 1913.

1,181,634.

Patented May 2, 1916.
8 SHEETS—SHEET 1.

Witnesses:

Inventor:
Eugene Bivert.
by Poole & Brown
Attys.

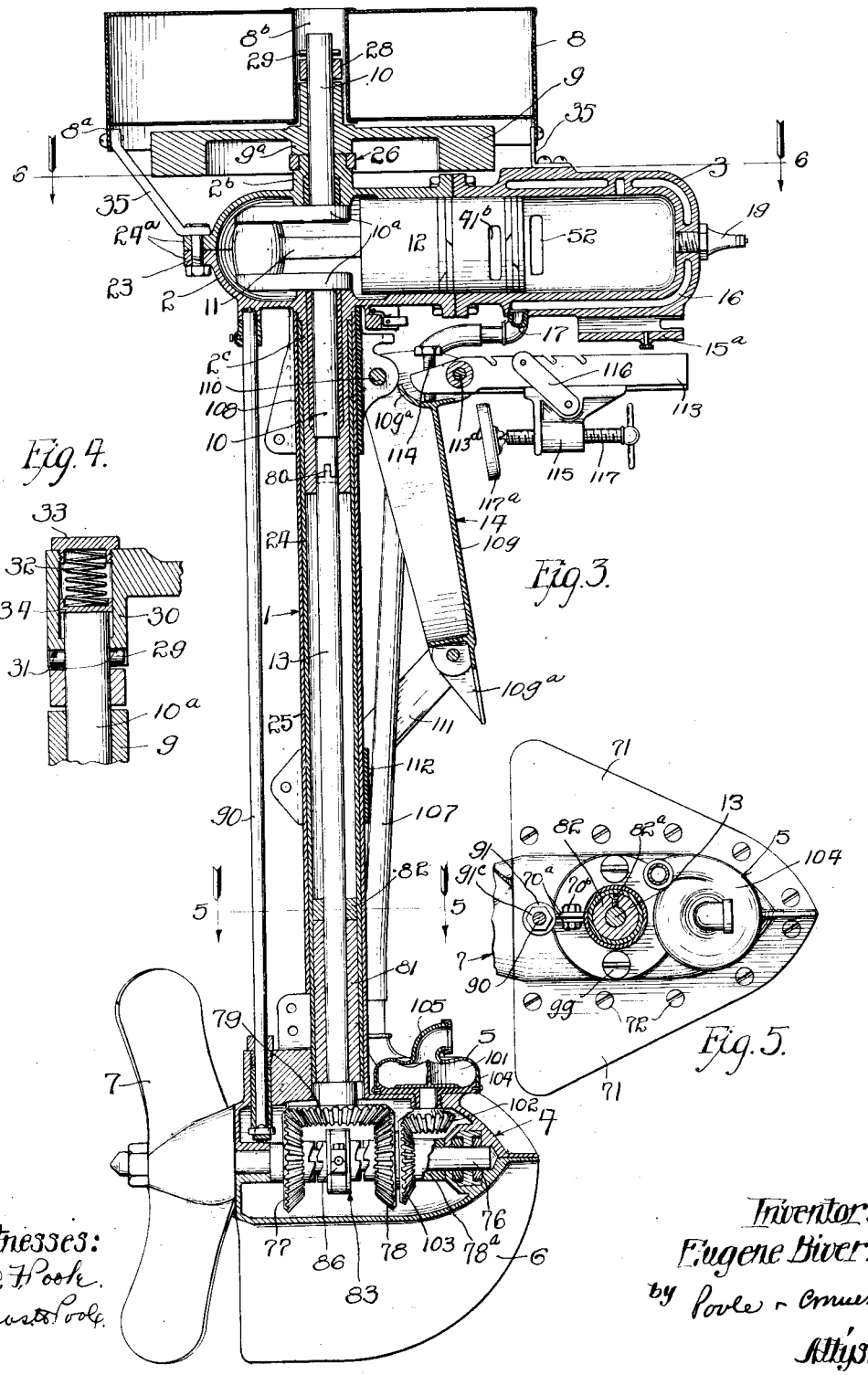

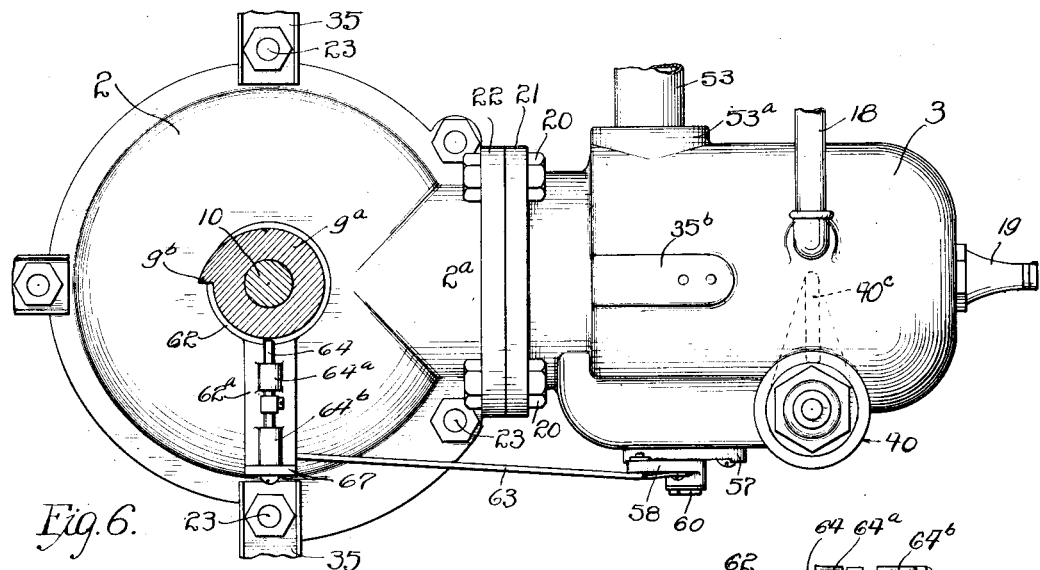
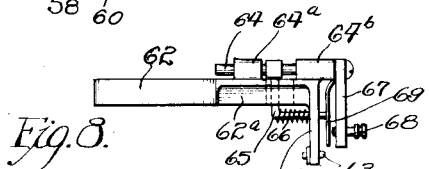
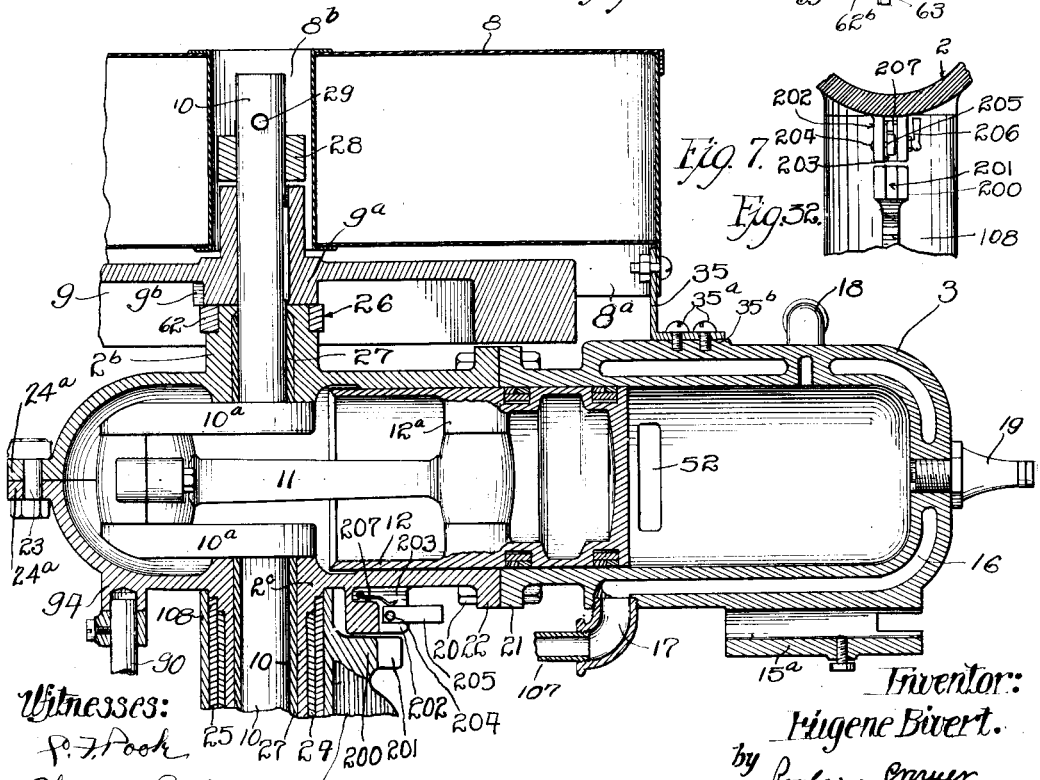

E. BIVERT.
AUXILIARY MARINE MOTOR.
APPLICATION FILED JAN. 24, 1913.
1,181,634.
Patented May 2, 1916.
8 SHEETS—SHEET 4.
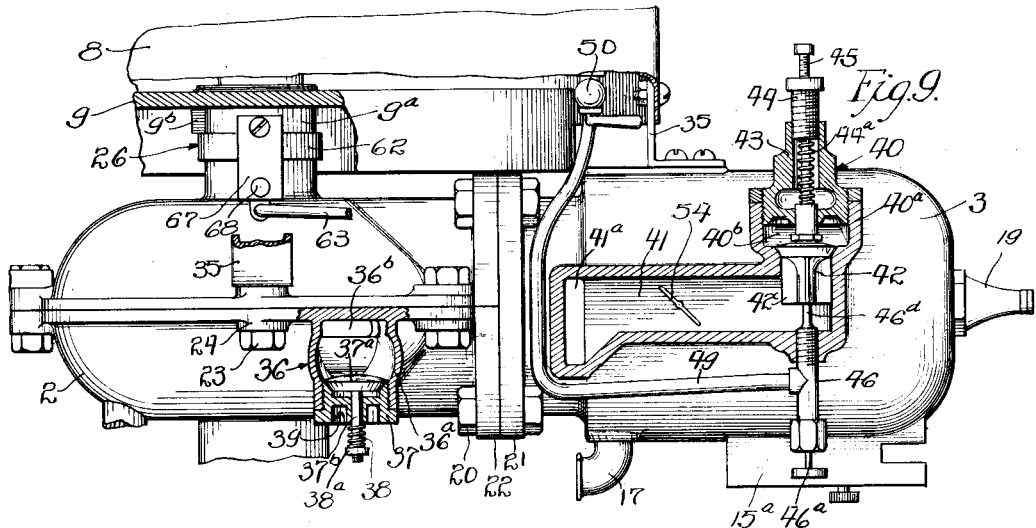
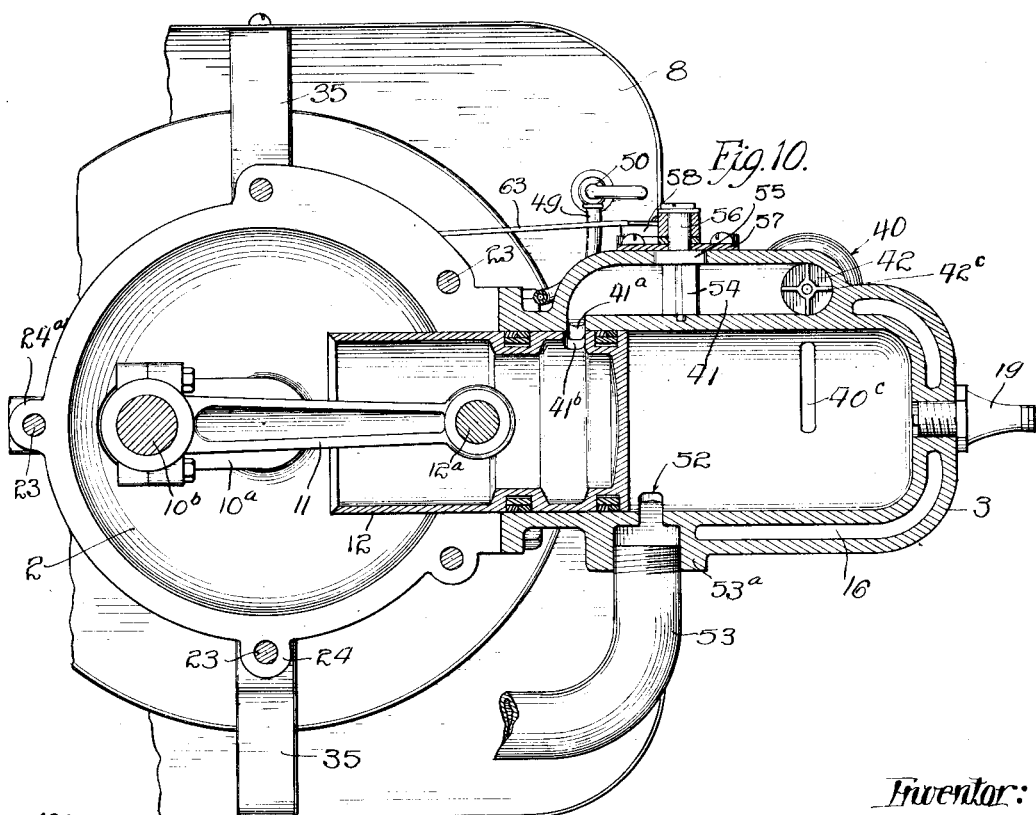
Witnesses:
P. J. Poole
Chas. H. Poole
Inventor:
Eugene Bivert.
by Poole & Brown
Attys.

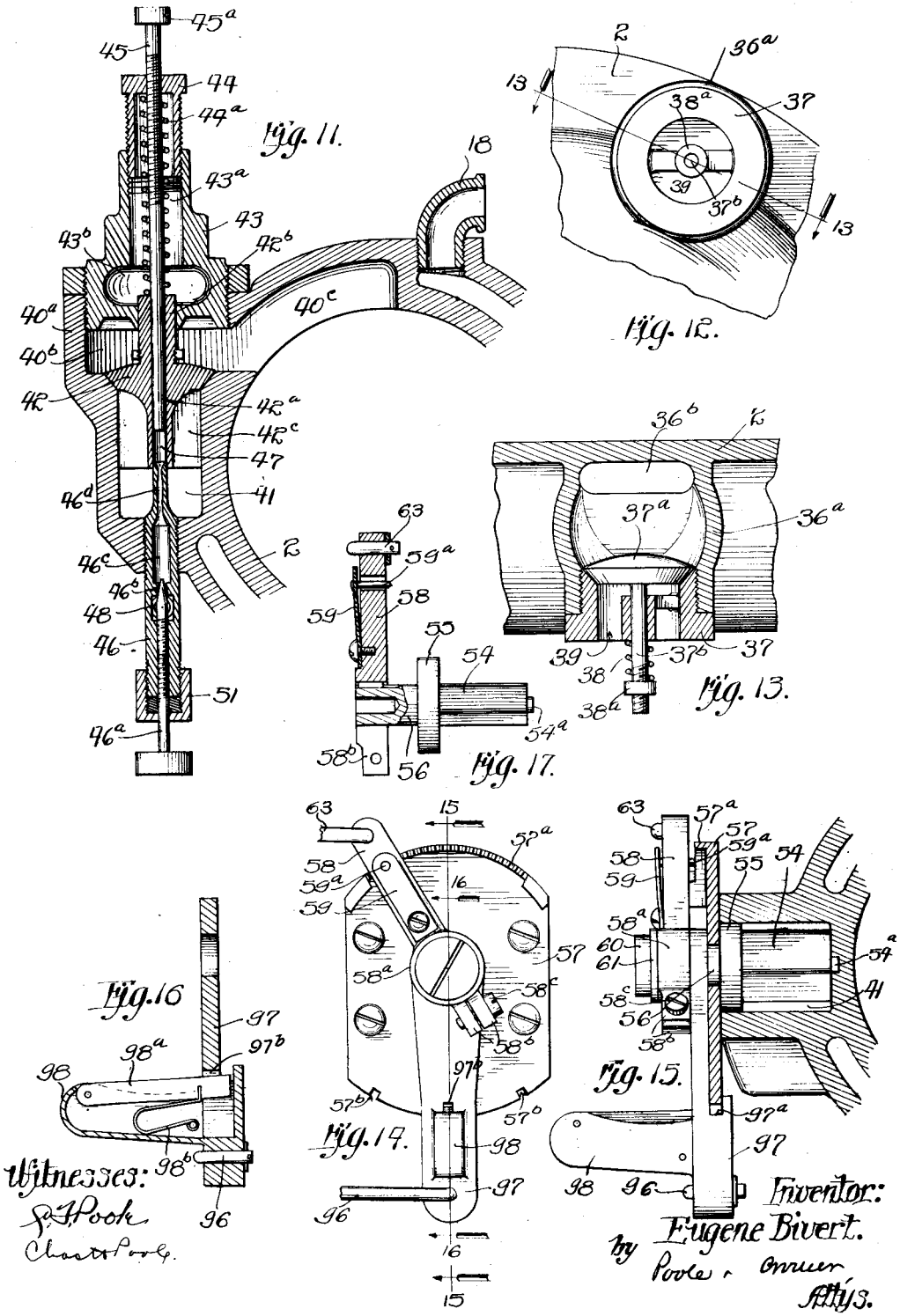

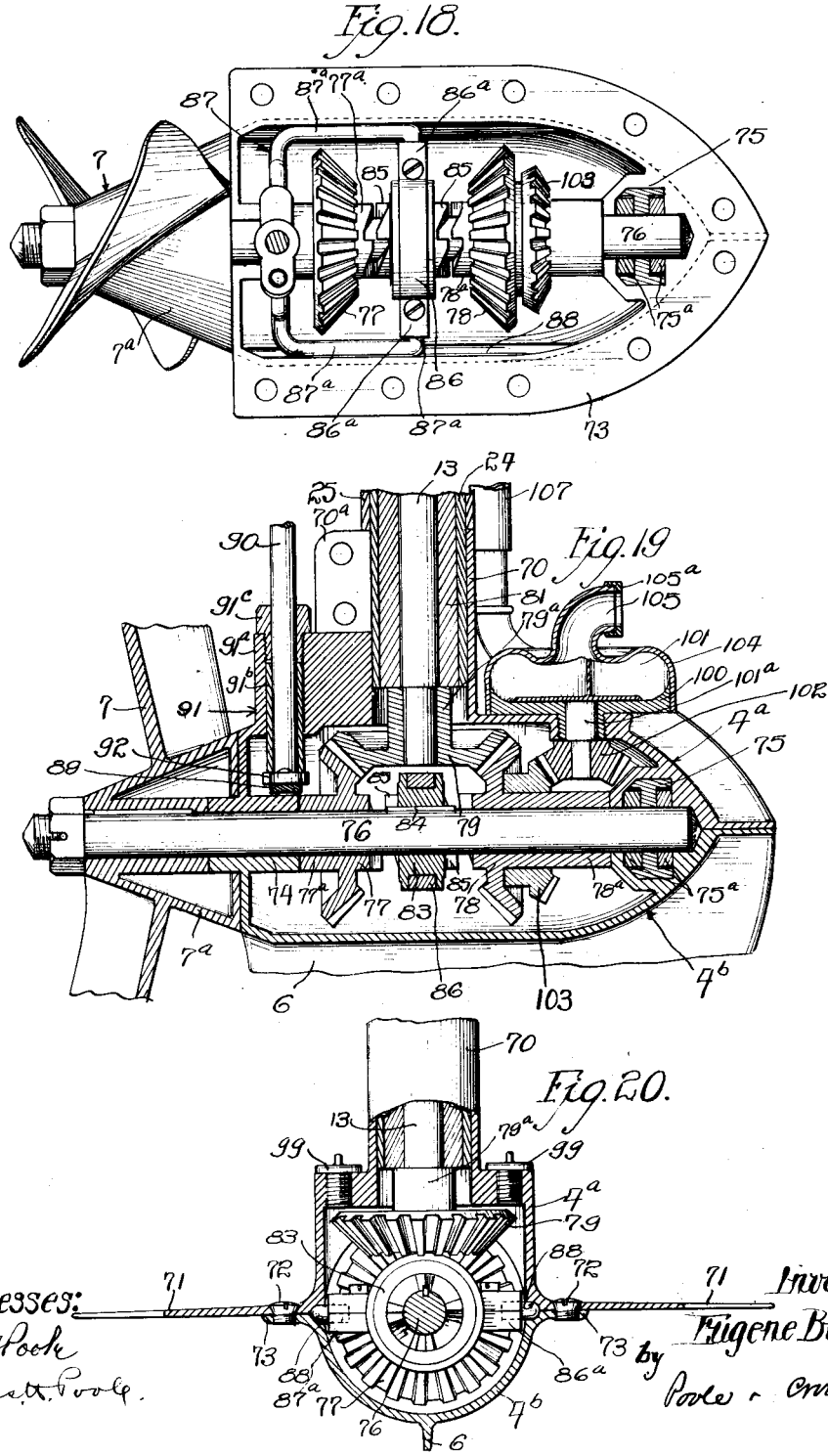

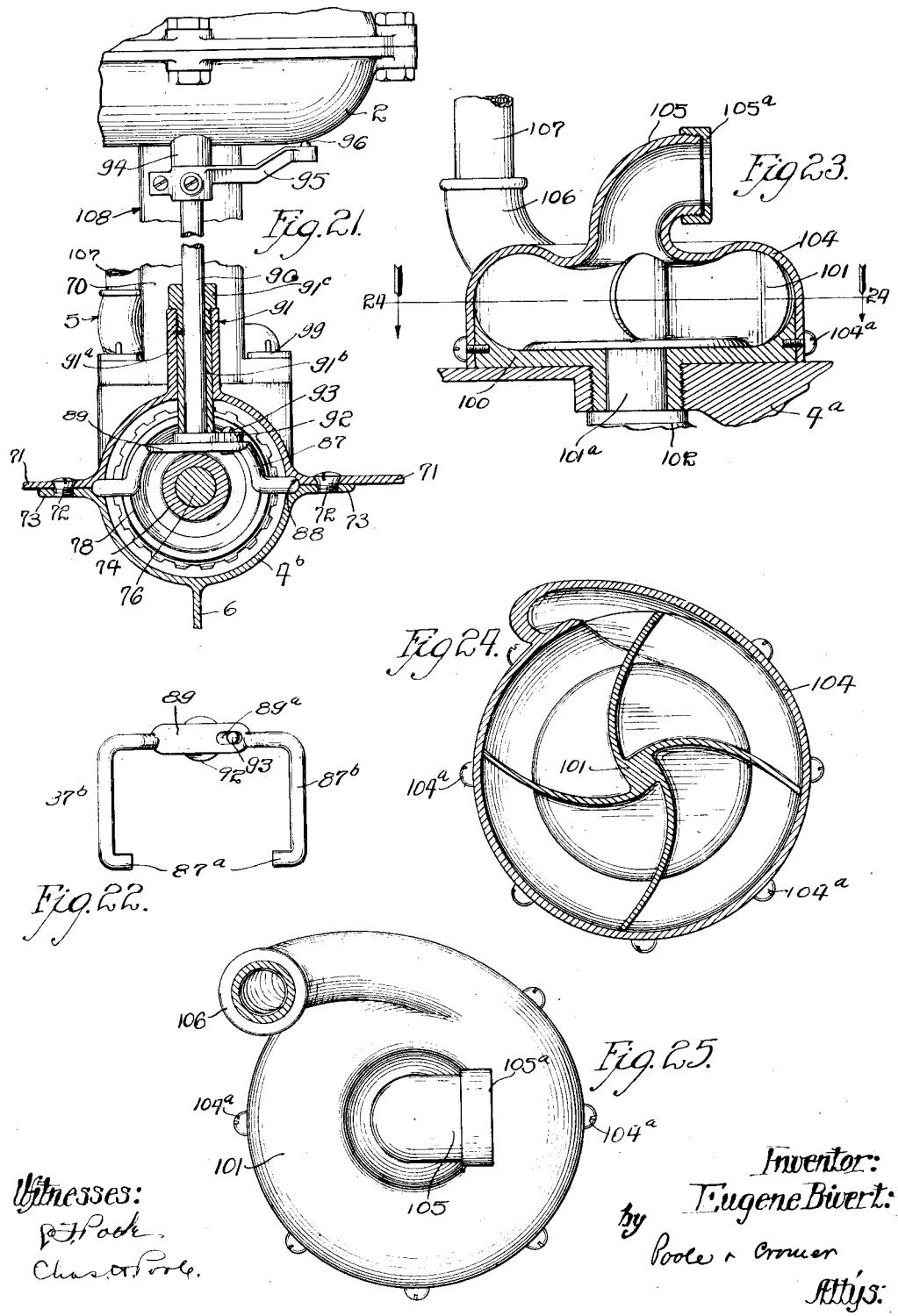

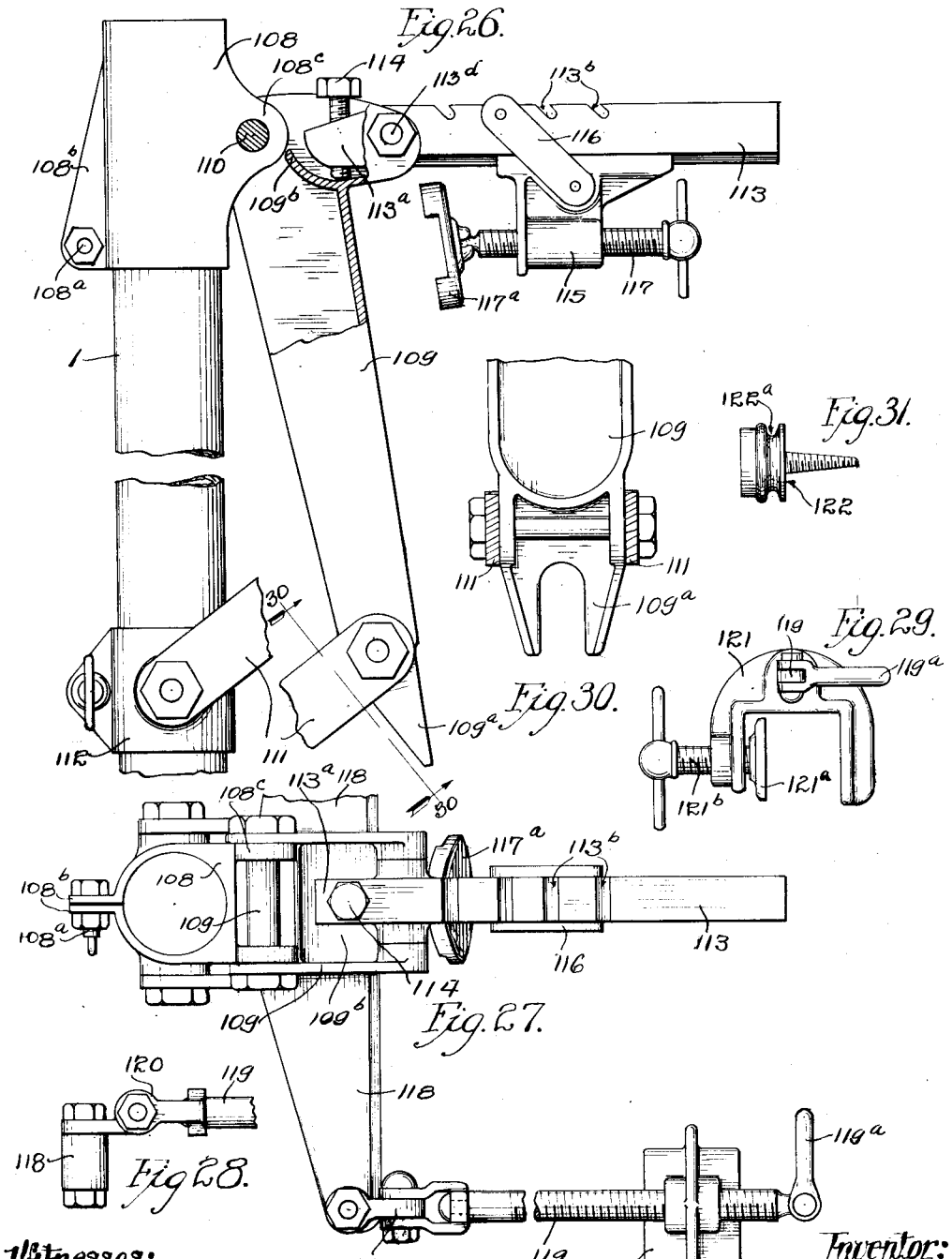

UNITED STATES PATENT OFFICE.

EUGENE BIVERT, OF CHICAGO, ILLINOIS.

AUXILIARY MARINE MOTOR.

1,181,634.

Specification of Letters Patent.   Patented May 2, 1916.

Application filed January 24, 1913.   Serial No. 743,900.

*To all whom it may concern:*

Be it known that I, EUGENE BIVERT, a citizen of the United States, and a resident of Chicago, in the county of Cook and State of Illinois, have invented certain new and useful Improvements in Auxiliary Marine Motors; and I do hereby declare that the following is a full, clear, and exact description thereof, reference being had to the accompanying drawings, and to the letters of reference marked thereon, which form a part of this specification.

This invention relates to improvements in marine motors and more particularly to that class of devices above mentioned which are adapted to be attached to the stern of small craft or boats as a means for propelling the same.

It is the object of my invention to provide a construction for a marine motor that embodies the features of compactness, lightness of weight, high efficiency, convenience and flexibility of control, adaptability to all forms of boats, and numerous other advantages that will be pointed out in the following description of the preferred form of my invention shown in the accompanying drawings.

My invention consists in the matters hereinafter described and more particularly pointed out in the appended claims.

Figure 1:
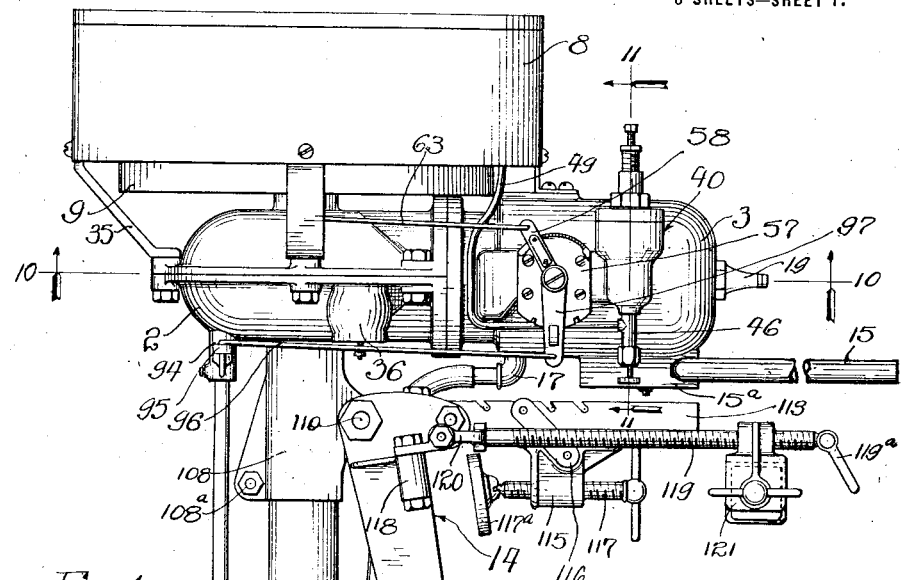
Figure 2:
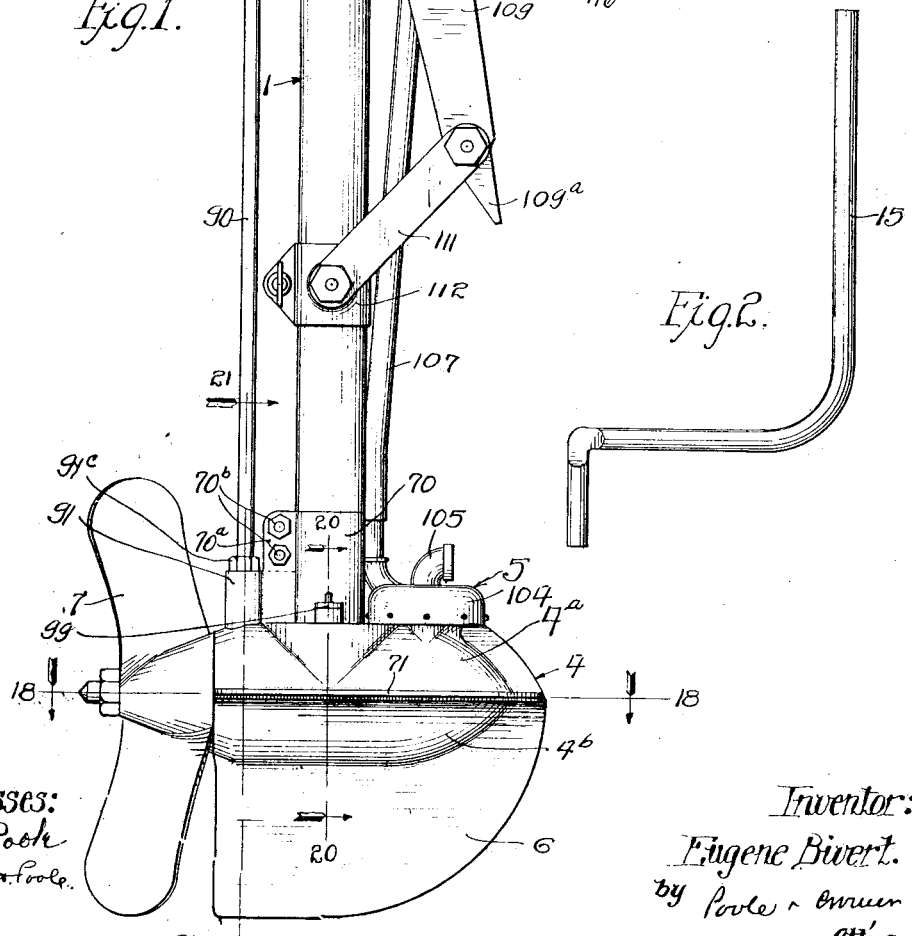

Referring to the drawings, Figure 1 is a view in side elevation of my improved marine motor; Fig. 2 is a plan view of the tiller; Fig. 3 is a view in longitudinal section of the motor; Fig. 4 is a detail cross-section showing the upper extremity of the shaft and a portion of the starting crank in position to rotate the shaft; Fig. 5 is a cross sectional view, taken on line 5—5 of Fig. 3; Fig. 6 is an enlarged cross sectional view taken on line 6—6 of Fig. 3; Fig. 7 is an enlarged fragmentary view of Fig. 3 showing the cylinder, fly wheel, tank and the piston in cross section; Fig. 8 is a detail view, in elevation, of the timing mechanism removed from the motor; Fig. 9 is an enlarged view in elevation of the cylinder and parts adjacent thereto, showing portions broken away and the inlet and exhaust valve in section; Fig. 10 is an enlarged cross sectional view taken on line 10—10 of Fig. 1; Fig. 11 is an enlarged cross sectional view taken on line 11—11 of Fig. 1; Fig. 12 is a bottom plan view of the air inlet valve and a portion of the crank case; Fig. 13 is a cross sectional view taken on line 13—13 of Fig. 12; Fig. 14 is a detail view of the transmission, throttle and ignition controlling levers and controller plate; Fig. 15 is a cross sectional view taken on line 15—15 of Fig. 14; Fig. 16 is a detail cross sectional view of the transmission controlling lever taken on line 16—16 of Fig. 14; Fig. 17 is a detail view of the throttle valve removed from the motor, showing the throttle lever in cross section; Fig. 18 is a cross sectional view of the transmission case taken on line 18—18 of Fig. 1; Fig. 19 is an enlarged portion of Fig. 2 showing the transmission case; Fig. 20 is an enlarged cross sectional view, taken on line 20—20 of Fig. 1; Fig. 21 is a cross-sectional view taken on line 21—21 of Fig. 1, and a view in end elevation of the crank case, with portions being broken away; Fig. 22 is a top plan view of the transmission shifting yoke removed from the transmission case; Fig. 23 is an enlarged vertical cross sectional view of the centrifugal pump; Fig. 24 is a cross sectional view taken on line 24—24 of Fig. 23; Fig. 25 is a top plan view of the centrifugal pump; Fig. 26 is a view in side elevation of the supporting bracket and sleeves with portions broken away; Fig. 27 is a top plan view of the supporting bracket; Fig. 28 is a detail view in side elevation of the swivel connection between the side rod and the lateral arm of the supporting bracket; Fig. 29 is a view in end elevation of the side rod showing the clamp mounted thereon; Fig. 30 is an enlarged cross sectional view taken on line 30—30 of Fig. 26; Fig. 31 is a view in side elevation of the retaining screw for the supporting bracket; Fig. 32 is a detail view of a locking device to be hereinafter referred to.

Referring to the drawings, and, first, to Figs. 1 and 2 in particular, a vertical tubular post 1 supports at its upper end a crank case 2 and cylinder 3 of a two-cycle internal combustion engine, the axis of the same being at right angles to that of the post 1. At the lower end of the post 1 is supported the transmission case 4, containing a gear mechanism, clutch mechanism, a propeller shaft and gearing adapted to drive a centrifugal pump 5 mounted upon the transmission case. A downwardly extending fin 6, integral with the transmission case, acts as a rudder. The propeller 7 is attached to the outer extremity of the propeller shaft.

Mounted above the engine is a fuel tank 8 and between said tank and the engine is located a fly wheel 9, adapted to rotate in a horizontal plane and rigidly attached to the upper extremity of the vertical crank shaft 10. A connecting rod 11 transmits the power exerted upon the piston 12 to the crank shaft, in the usual manner. A driving shaft 13 is contained within the post 1 and has driving connection with the lower extremity of the crank shaft 10 and with the propeller shaft, through the medium of the clutch and gear mechanism within the transmission case 4.

A bracket 14 is adjustably secured to the post 1 of the motor and is adapted to be secured to the stern portion of a boat or small craft. A tiller 15 (Fig. 2) is adapted to be removably secured within a channel 15$^a$ located upon the under side of the cylinder 3 whereby the entire motor and connected parts may be rotated to steer the craft by the action of the vehicle fin or rudder 6.

Referring more in detail to the construction of the motor, the cylinder 3 (Figs. 6 and 7) is of the type commonly employed in internal combustion engines having double walls with a space 16 therebetween adapted to carry the circulating water for cooling the cylinder. Said space or water jacket 16 is provided with an inlet 17 entering at the bottom and lower end of the cylinder and a discharge outlet 18 at the top of the cylinder. An aperture is provided at one end of the cylinder in which is mounted a spark plug 19, the same having screw-threaded engagement with the cylinder. The cylinder 3 is rigidly attached to the crank case 2, by means of a plurality of bolts 20 extending through annular flanges 21 and 22 of the cylinder and crank case respectively. The crank case 2 is preferably formed of two similar circular and disk-shaped members coacting at their peripheries and rigidly held together by means of a plurality of bolts 23 extending through a plurality of oppositely arranged lugs 24$^a$. Said crank case is provided with a cylindrical portion 2$^a$ adjacent to the flange 22, having an interior bore corresponding to that of the cylinder. The crank case is further provided with upper and lower crank shaft bearings 2$^b$ and 2$^c$, respectively, the same being concentric with the central or vertical axis of the motor. Within said bearings is journaled the crank shaft 10. The lower bearing 2$^c$ is considerably longer than the upper bearing and fits within the inner sleeve 24 of the post 1, (Figs. 3 and 7) and is rigidly connected thereto. An outer sleeve 25 surrounds the inner sleeve 24 and is rotative relative thereto, and likewise, relative to the crank case 2 and bearing 2$^c$. Said outer sleeve is in abutting relation with a shoulder formed in the exterior surface of the bearing 2$^c$ adjacent to the crank case. The extremity of the upper crank shaft bearing is provided with a shoulder upon which is mounted the timing mechanism 26, hereinafter more fully described. The inner surfaces of said bearing members are preferably recessed for the purpose of retaining bushings or linings 27, 27, of Babbitt-metal or other antifriction metal. The extremities of the crank shaft 10 are journaled in said bearings, the upper one of which extends considerably beyond the same, and has rigidly mounted thereon the fly wheel 9, the same bearing downwardly upon the upper surface of the bearing 2$^b$ along the adjacent face of the hub 9$^a$ of the said fly wheel. Immediately above the fly wheel and rigidly mounted upon the crank shaft is a collar 28. Extending diametrically through the crank shaft adjacent to its upper extremity is a pin 29 (Figs. 4 and 7), the ends of which project beyond the shaft. Said pin is adapted to be engaged by the hub 30 of a starting crank (Fig. 4) (a portion only of which is shown), said hub having a cylindric bore adapted to receive the extremity of the crank shaft, and being provided at its lower end with diametrically arranged slots 31, 31, adapted to engage the end portions of the pin 29, whereby the crank shaft may be rotated in the proper direction to start the motor. To facilitate the removal of the starting crank from engagement with the crank shaft after the motor has been started, a tension spring 32 is placed within the bore of the hub 30; the said spring being interposed between a cap 33 rigidly connected with the hub 30 and a disk 34 axially movable within the bore of the same. In applying the starting crank, the same is pressed downward, forcing disk 34 upward and compressing the spring. Said spring expands when the torque produced by the starting crank ceases in the starting of the motor, whereby the slots 31 are automatically thrown out of engagement with the pin 29, and the starting crank is prevented from being carried around with the crank shaft.

The two crank-webs 10$^a$ of the crank shaft lie in a horizontal plane within the crank case and in abutting relation to inwardly projecting portions of the bearings 2$^b$ and 2$^c$. The connecting rod 11 is journaled at one extremity to the crank pin 10$^b$ extending between the webs 10$^a$ and at its other extremity engages a wrist pin 12$^a$ located within the interior of the piston 12. Said piston is of the type commonly used in gas engine practice, being hollow and open at its lower end to the interior of the crank case.

The fuel tank 8, preferably rectangular in shape with rounded corners, is mounted above the cylinder and crank case by means of a plurality of brackets or braces 35, each attached at one end to one of the bolts 23 of the crank case and at its other end to a downwardly depending flange 8ª of the tank 8, which partially incloses the fly wheel. One of said braces 35 is secured to the cylinder by means of screws 35ª, which are anchored in a boss 35ᵇ (Fig. 7) of the cylinder. The said fuel tank is provided with a central opening 8ᵇ adapted to embrace the extremity of the crank shaft and parts mounted thereon, and into which the cylindric hub 30 of the starting crank may extend to engage the crank shaft.

Referring now to the operative parts on the cylinder and crank case, by which the explosive charges may be admitted and waste products of combustion discharged, in the manner common to two-cycle explosive engines. An air inlet valve 36 is provided in the wall of the crank case, here shown as located immediately below the horizontal axis of the same and adjacent to the cylinder. Said inlet valve is automatically operated and comprises a valve casing 36ª (Figs. 9, 12 and 13) forming a valve chamber which communicates with the interior of the crank case by means of a port 36ᵇ. Said valve casing opens downwardly and contains at that point a valve bushing 37. Mounted to move vertically, and centrally of said valve bushing, is a valve disk 37ª adapted to rest upon a tapered valve seat in the bushing and provided with a stem 37ᵇ extending downwardly through said bushing. A spring 38, mounted upon said valve stem, tends to constantly hold said disk upon its seat, the spring 38 bearing at one end upon the bushing 37, and at its other end upon a collar 38ª. Said collar has screw-threaded engagement with the stem 37ᵇ, whereby the tension of the spring may be adjusted. A plurality of ports 39 extend through said bushing, and are adapted to admit the air into the crank case when the valve disk is lifted from its seat by the partial vacuum created within the crank case during the forward stroke of the piston.

Upon the side of the cylinder is the mixture inlet or controlling valve device 40 (Figs. 9 and 10). This valve device comprises an upwardly opening cup-shaped valve casing 40ª formed integral with the cylinder and forming a mixing chamber 40ᵇ, which communicates with the interior of the cylinder through a port 40ᶜ (Figs. 10 and 11). The valve chamber 40ᵇ communicates at its lower end with an air passage 41 (Figs. 9 and 10), the walls of which are integral with the wall of the cylinder and extend longitudinally of the same. In the opening from said valve chamber to said air passage 41 is located a valve disk 42; there being formed a tapered seat therefor in said opening, conforming with a similarly formed surface of the said valve disk. The said valve disk is provided with vertical, radial wings or flanges 42ᶜ which have sliding engagement with the cylindric wall of the passage 41 adjacent to and below the valve seat. Said passage communicates at its end remote from the valve casing 40ª, with the interior of the cylinder, by means of a rectangular port 41ª located near the end of the said cylinder adjacent to the crank case. A port 41ᵇ (Figs. 3 and 10), is provided in the piston, which is adapted to register with the said port 41ª when the piston is at the end of its outward stroke, in which position of the piston communication is established between the passage 41 and the interior of the crank case.

Referring in greater detail to the construction of the mixture inlet valve 40 (Fig. 11), the valve casing 40ª is provided with a hollow or tubular head 43 having screw-threaded engagement therewith. Said head 43 is provided with a central vertical bore 43ª, the upper end of which is closed by a cap 44 having screw-threaded engagement with the head. A rod 45, provided with a head 45ª and screw threads adjacent thereto, extends downwardly through said cap and the bore 43ª of the head 43, said screw threads having engagement with similar threads in the aperture of the cap through which the rod passes. Said rod further enters and extends downwardly into a central bore 42ª of the valve disk 42 and terminates adjacent to its lower extremity. Said valve disk is further provided with an upwardly extending cylindric portion 42ᵇ, which enters and slides in an aperture in the head 43 and terminates in a space in the chamber 43ᵇ, forming an enlargement of the lower end of the bore 43ª of said head 43. Surrounding said rod 45 is a coiled spring 44ª, which enters and bears at its upper end against the cap 44 and at the lower end bears against the upper face of the cylindric portion 42ᵇ of the valve disk. Said spring is adapted to constantly exert a pressure upon the valve disk tending to hold the same upon its seat, the tension of said spring being adjustable by the upward or downward movement of the cap 44 due to the rotation of the same relatively to the head 43.

Lying in a vertical axis of the valve and extending upwardly through the lower wall of the passage 41 is a needle valve adapted to control the admission of the liquid fuel into the valve. The said needle valve comprises a tubular casing 46 provided with a valve stem 46ª having screw-threaded engagement therewith and having a conical extremity adapted to seat within a similar shaped valve seat 46ᵇ, within the valve casing. Immediately above said valve seat 46ᵇ is a chamber 46ᶜ which communicates at its upper end with a nozzle 46ᵈ. Said nozzle 46ᵈ projects upwardly into the interior of the passage leading to the mixing chamber and is of a length such that the extremity of the same enters the lower end of the central bore 42ᵃ of the valve disk, when the same is in its closed position, and at such a distance from the lower end of the rod 45 as to form a small chamber 47 within the said central bore of the valve disk.

Immediately below the valve seat 46ᵇ of the needle valve is an inlet chamber 48 into which enters the fuel supply pipe 49 (Fig. 9), the same extending to the tank 8, there being provided in said pipe a shut-off cock 50 immediately below the tank. A suitable packing gland 51 is provided at the lower end of the needle valve through which extends the valve stem 46ᵃ, the same being provided with a head by which the same may be turned to control the amount of fuel flowing through the valve. The cylinder is also provided with an exhaust port 52 (Figs. 9 and 10), which is located near the open end of the cylinder and diametrically opposite the passage 41. Said exhaust port communicates with the atmosphere by means of an exhaust pipe 53 secured in a boss 53ᵃ on the cylinder.

The operation of the engine may be described as follows: Assuming that the piston is at the inner end of the stroke, and an explosion has taken place by the ignition of a charge of the compressed mixture within the combustion chamber, the force of the explosion forces the piston outwardly to give its power stroke, during which stroke the charge of air is compressed within the crank case, which was previously drawn therein through the valve 36. Immediately before the piston reaches the end of its backward stroke, the exhaust port is uncovered, as seen in Fig. 10, and the burned or exhaust gases escape to the atmosphere. At the end of its outward stroke the piston is in a position such that the port 41ᵇ thereof registers with the port 41ᵃ, thus permitting the air compressed within the crank case to escape into the passage 41 through the valve 40, where it is mixed with or taken up by the liquid fuel, which is rapidly evaporated thereby, the explosive mixture of air and vapor entering the cylinder through the port 40ᶜ. By the upward stroke of the piston the ports 41ᵃ and 52 are closed, whereupon the fresh charge is confined within the cylinder, and further compressed until the time of ignition whereupon another impulse is transmitted to the piston, to give its next power stroke, thus completing a cycle, in accordance with the usual series of events in a two-cycle engine.

It is to be particularly noted that the free air is compressed within the crank case previous to the event of mixing or carbureting. The valve 40 accomplishes the act of mixing in the following manner: The needle valve 70 is so regulated that a constant flow of fuel passes from the nozzle 46ᵈ. During the time between the events of ignition and the end of the power stroke, the valve is closed, that is, the valve disk is held upon its seat, hence it is obvious that during the said interval a quantity of fuel will flow into and fill the chamber 47 within the central bore of the valve disk. At the instant that the compressed charge from the crank case acts upon the valve disk, the latter will be raised from its seat, thereby liberating the charge within the chamber 47; the same being instantly vaporized and mixed with the charge of air passing through the valve. It is necessary to provide regulating means to vary the mixture and also the force necessary to unseat or open the valve. To accomplish the first purpose the rod 45 is provided, which by being moved upwardly or downwardly will increase or decrease the size of the chamber 47, and consequently the amount of the fuel which is liberated to be mixed with the charge of compressed air. To accomplish the second purpose the spring 44ᵃ is provided, the tension of which may be varied by rotating the cap 44, with the effect of varying the force exerted upon the valve disk 42 and consequently the force that must be exerted by the entering charge in order to lift the valve disk from its seat.

The motor illustrated is also provided with mechanism to control the operation thereof under varying conditions of load and speed to which it is subjected. For this purpose a throttle valve and timing mechanism is provided. Describing first the throttle valve (Figs. 14 to 17), the same comprises a butterfly valve 54 (Figs. 9 to 15), consisting of a rectangular plate of a size approximately corresponding with the cross sectional form of the passage 41, pivoted to turn on a horizontal axis within said passage 41. Said valve 54 is provided at its inner margin with a short stud 54ᵃ journaled within a recess in the inner wall of the passage. Integral with the butterfly valve, at its outer margin, is a bearing disk 55, which fits and turns within a circular aperture in the outer wall of the passage 41. Projecting outwardly from said bearing disk is an axially arranged stub shaft 56, which extends through the central portion of a controller plate 57 rigidly secured to the outer vertical wall of the said passage. Said controller plate (Figs. 14 and 15) has its upper and lower margins formed in arcs of a circle, the said upper margin being provided with a laterally projecting flange 57ᵃ, in which are cut a plurality of small notches. A controlling lever 58 is rigidly secured to the outer extremity of said stub-shaft 56 and at a short distance from the face of the plate 57, by means of a split ring portion 58ª integral therewith, and which surrounds and grips the said stub-shaft; said portion 58ª having integral clamping lugs 58ᵇ, through which extends a clamping screw 58ᶜ. The controlling lever 58 is also provided with a flat spring 59 secured at its lower end to its outer surface and provided at its upper end with a pin 59ª, which extends through an aperture in the lever and engages the notches of the flange 57ª, thereby tending to constantly hold the lever from movement when in any adjusted position thereof. A screw 60 and a washer 61 are preferably provided at the end of said stub-shaft 56 to hold the controlling lever from endwise movement in said shaft.

As before mentioned, the timing mechanism 26 is mounted upon the upper bearing 2ᵇ of the crank case adjacent to the fly wheel (Figs. 6 and 7), and comprises a ring portion 62 (Fig. 8) adapted to rotate in a horizontal plane and located in an annular groove formed between a shoulder of the bearing and the adjacent face of the hub 9ª of the fly wheel 9. Integral with said ring portion and extending radially therefrom is an arm 62ª provided with a downwardly projecting arm 62ᵇ. Extending from the extremity of said arm 62ᵇ to the upper extremity of the controlling lever 58 is a control rod 63, by means of which the timing mechanism may be rotated through the arc of a circle, the degree of such movement being dependent upon the extent of endwise movement of the control rod 63.

Upon the upper face of the arm 62ª is mounted a plunger 64 retained in bearings 64ª, 64ᵇ, and extending inwardly and terminating adjacent to the normal circumference of the hub 9ª of the fly wheel, but which is adapted to be moved outwardly by contact with a cam projection 9ᵇ formed upon the periphery of the hub 9ª.

Adjustably secured to the plunger 64, at a point between the bearings 64ª and 64ᵇ is an angular plunger arm or pin 65 (Fig. 8) which extends downwardly through a slot in the arm 62ª and outwardly through the arm 62ᵇ, terminating at a point slightly beyond the same. A small coiled spring 66 surrounds the horizontal portion of the pin 65 and is adapted to constantly force the same inwardly. Mounted upon the outer end of the bearing 64ᵇ and extending downwardly therefrom is a contact plate 67, in the lower end of which is mounted an inwardly extending contact pin 68, having screw threaded engagement with said contact plate. Similarly mounted and interposed between the arm 62ᵇ and the plate 67 is a flat spring 69 adapted to be forced outwardly by the plunger arm into contact with the contact pin when the plunger 64 is actuated by its contact with the cam projection 9ᵇ. The contact plate 67 is insulated from the remainder of the timing mechanism, there being an electrical connection (not shown) between the same and the spark plug. Likewise there is an electrical connection (not shown) between the remainder of the timing mechanism and the induction coil. It follows that ignition takes place only when the contact pin 68 and the spring 69 are in contact. By this means, therefore, the time of ignition is determined by the angular position of the timing mechanism, which may be varied by the controlling lever.

The devices described constitute a unit system of ignition and throttle control so operating that any variation in the amount of air passing through the passage 41 is accompanied by corresponding variations in the time of ignition. The term "time of ignition," as used here, refers to the time of ignition of the charge relatively to the position of the piston at that instant.

The transmission case 4 (Figs. 18, 19 and 20), before mentioned as mounted at the lower end of the post 1, comprises a cylindrical shell, tapered to a point at its forward end, and preferably consisting of two portions, to wit, an upper section 4ª and a lower section 4ᵇ. The upper section is joined to the inner sleeve 24 of the post 1, by a cylindric clamp 70 which surrounds the adjacent or lower end of the sleeve 24 and is clamped thereon by means of outwardly extending flanges 70ª, on either side of a longitudinal slot in the sleeve, through which extend clamping bolts 70ᵇ (Fig. 1). Surrounding the lower margin of said upper portion 4ª of the case is a flat, horizontal, laterally extending flange 71 (Figs. 5 and 20), the same being approximately triangular in shape, as seen in plan view. The point of such flange is at its forward end, so that fins are formed on either side of the transmission case. Said fins are adapted to give additional stability to the craft to which the motor is attached, and also act as a means for protecting the propeller from contact with objects in the water. It is obvious that instead of said flange 71 being provided on the upper section 4ª, the same may be provided on the lower section 4ᵇ.

The lower section 4ᵇ of the case is secured to the upper section 4ª thereof by means of a plurality of screws 72 extending through the flanges 71 and 73 of the upper and lower sections, respectively. Extending downwardly from the lower section of the case, and in the vertical plane of the central axis, is a flange or fin 6, constituting both a rudder and a means for protecting the propeller from contact with obstacles in the water; the same having a curvilinear margin throughout its forward portion. Said fin is preferably made or cast integral with said lower section of the case.

At either end of the transmission case are bearings 74 and 75, within which is journaled the propeller shaft 76. The propeller 7 is rigidly attached to the rear end of said propeller shaft. Said propeller is provided with a hub $7^a$ having the form of the frustum of a cone, the base of which abuts against the flat, rear end wall of the transmission case; said wall supporting the bearing 74, which projects slightly into the interior of the propeller body. The bearing 75 at the opposite end of the case supports the other end of the shaft 76, and is a thrust bearing, there being thrust bearing collars $75^a$ mounted upon the shaft, which rotate therewith within annular grooves of the bearing.

Loosely mounted upon the propeller shaft are two miter gears 77 and 78, adapted to mesh with a similar miter gear 79 rigidly mounted on the lower end of the vertical shaft 13. Said shaft is contained within said post and is connected to the lower end of the crank shaft 10 by a tongue and slot connection 80, as seen in Fig. 3. Adjacent to the lower end of the post 1, within the sleeve 24 and surrounding the shaft 13, is a bushing 81, which abuts against the hub $79^a$ of the gear 79 at its lower end. Immediately above said bushing is a collar 82 secured to the shaft 13 by means of a set screw $82^a$ (Fig. 5). Said collar is adapted to prevent axial movement of the bushing 81 relative to the shaft.

A clutch member 83 is mounted upon the propeller shaft between the miter gears 77 and 78, by means of a key 84, whereby the said clutch member is shiftable endwise upon the shaft but is non-rotative relatively to the shaft. The opposite end faces of said clutch member are provided with a plurality of similar clutch teeth 85 forming between them a plurality of similar notches. Each of said teeth is provided with a face parallel with the axis of the clutch member and a face at an angle oblique thereto. The teeth on opposite ends of the clutch member are arranged in such a manner that the holding faces thereof are parallel to the axis of the clutch member, but face in opposite directions. The inner extremity of the hubs $77^a$ and $78^a$ of the gears 77 and 78, respectively, are provided each with a plurality of similar clutch teeth and notches adapted to mesh with the teeth and notches of the said clutch member. The rotations of the gears 77 are obviously in opposite directions, so that the propeller shaft may be rotated in either direction by the shifting of the clutch member into engagement with either of the gears 77 or 78. Moreover, the clutch member may occupy a neutral position, midway between the gears, in which position the clutch member engages neither of the said gears, and hence no rotative movement is transmitted to the propeller shaft. The shifting of the clutch member is accomplished by means of the following mechanism: A non-rotative shifter ring 86 rests within an annular groove of the clutch member, and is provided with lugs $86^a$ having recesses therein adapted to receive the inwardly extending fingers $87^a$ of a U-shaped shifter yoke 87 (Fig. 22). The arms $87^b$ of the shifter yoke straddling the said shifter ring and the gear 77 are slidably supported in grooves 88 in the wall of the transmission case. Said arms are bent inwardly and upwardly and at their other extremities are united by a flattened portion 89 located immediately behind the gear 77 and above the hub thereof. Said flattened portion is provided with a slot $89^a$, located adjacent to one end thereof. A vertical shaft 90 (Figs. 3 and 21) is rotatably mounted exterior and adjacent to the post 1, and extends into the transmission case through a packing gland 91, comprising a cylindrical casing $91^a$, a bushing $91^b$ surrounding the shaft 90 and a gland $91^c$ having screw threaded engagement with said casing $91^a$. Mounted upon the lower extremity of the shaft 90 is a lever 92 provided at its outer end with a pin 93 adapted to engage the slot $89^a$ of the shifting yoke. The shaft 90 is journaled at its upper end within a boss 94 integral with the crank case, and is provided with an arm 95 rigidly secured thereto immediately below the boss 94. Said arm extends laterally and is connected at its end with a control rod 96 (Figs. 1 and 14) which extends forwardly and is likewise connected to the extremity of a controlling lever 97 (Figs. 14, 15 and 16) pivotally mounted upon the controller plate 57. Said lever 97 extends downwardly and is supported upon the stub shaft 56 between the said plate 57 and the timer control lever 58, the same being provided with a vertical slot $97^a$ adjacent to its lower end, adapted to engage the lower margin of the controller plate. Said lever is further provided with a laterally extending handle 98 adapted to be grasped in operating the same. Said handle is preferably made hollow and contains a lever $98^a$ (Fig. 16) pivoted at the outer end of the handle and adapted to be constantly forced upward by a spring $98^b$. The upper margins of the handle are concaved to permit a portion of the lever to project thereabove. Said lever extends into a vertical slot $97^b$ of the lever 97 and is adapted to engage notches $57^b$ spaced equally apart upon the lower margin of the plate 57, and at a distance such that the positions occupied by the controlling lever when engaging one of said notches will correspond with the neutral, forward and reverse positions of the gears in the transmission case.

Referring further to the transmission case 4 (Fig. 20), the upright cylindrical portion thereof immediately below the clamp 70 is provided with plugs 99, having screw threaded engagement with the top wall of said cylindrical portion and adapted to be removed to permit lubricating oil to be introduced into the transmission case. Mounted upon the top surface of the transmission case 4 is the centrifugal pump 5, adapted to supply the cooling water to the cylinder. Said pump comprises a bottom plate 100 (Figs. 19 and 23) having a central, depending hub which has screw threaded engagement with the wall of the transmission case, and provided with a central bore within which is journaled the stub shaft $101^a$ of the pump wheel 101. The lower extremity of said stub is reduced in diameter and carries a small miter gear 102, which meshes with a large miter gear 103 rigidly mounted upon the hub $78^a$ of the gear 78. Said pump wheel comprises a plurality of radially extending curved blades, having enlarged and rounded extremities. An annular pump casing 104 (Figs. 19, and 23 to 25) incloses said pump wheel and is rigidly secured at its lower margins to the bottom plate 100 by a plurality of screws $104^a$. The outer portions of said casing and said bottom plate are shaped to conform with the curved extremities of the blades. An inlet pipe 105 enters the central top portion of the pump casing, the same curving upwardly and forwardly and being preferably provided at its inlet opening with a cap $105^a$, acting to retain a wire-mesh strainer, or the like, to prevent solid matter being drawn into the pump. An outlet pipe 106 projects from the pump casing at the periphery thereof, in a line tangent or spiral to the path of the blades. Said outlet pipe curves upwardly and communicates with a flexible pipe or hose 107 (Figs. 1 and 23), which extends upwardly and communicates with the water jacket of the cylinder at the inlet 17 thereof. The water is drawn into the pump through the inlet and is forced from the pump through the outlet by the centrifugal action of the blades upon the water, said blades being rotated by the gearing within the transmission case.

The supporting bracket 14 (Figs. 1 and 26 to 31), by which the motor may be attached to and supported upon the stern of a craft, is constructed as follows: A clamp or split sleeve 108 surrounds and is adjustably secured to the post 1, below the crank case, by means of a bolt $108^a$, which extends through lugs $108^b$ located on each side of the vertical slot in the sleeve. Lugs $108^c$ are also provided upon the opposite side of the sleeve and between the same is pivotally mounted a bracket 109, by means of a bolt 110 extending through said members. Said bracket extends downwardly at an angle to the post 1, and is provided with a forked lower extremity $109^a$ (Fig. 30). Pivotally mounted on opposite sides of the bracket 109 and adjacent to its lower extremity, are arms 111 which extend downwardly and rearwardly and are likewise pivoted to a sliding sleeve 112 mounted upon the post 1, and adapted to be moved upward or downward to adjust the bracket to the desired angle relative to the stern of the craft, in which position it is made fast to afford additional support to the bracket. Pivoted to the upper portion of said bracket by a horizontal pivot $113^d$ is a horizontal clamp-carrying arm 113. Said arm is provided with an inwardly extending projection $113^a$ through which extends an adjusting screw 114. Said screw is adapted by its contact with a curved web $109^b$ (Fig. 26) of the bracket, to limit the rotative movement of the said arm 113. By means of said adjusting screw the said arm may be held in a horizontal position, whatever may be the angular position of the bracket 109. Having sliding engagement with said arm 113, is a clamp-carrying member or bracket 115, the same being locked in position on said arm by means of a yoke 116, pivoted to said clamp bracket and adapted to engage any one of a plurality of notches $113^b$ in the top surface of the arm 113. Said bracket 115 supports a stem 117 having screw-threaded engagement therewith and provided with a clamping plate $117^a$, connected by a ball and socket connection with the rear end of said stem 117. By advancing said clamping plate toward the bracket 109, the stern portions of the craft may be gripped between said parts. The said clamp bracket 115 is made adjustable on the arm 113, in order to provide a large range of adjustment in the clamping plate toward and from the bracket, so that the motor may be easily attached to crafts having variously shaped sterns. Integral with said bracket 109 and located adjacent to the upper extremity thereof are two laterally extending arms 118, 118, (Fig. 27) to the outer ends of which are secured rods 119, by means of swivel members 120. Said rods are rotatably mounted in the swivel members 120, and provided with screw threads and at their rear ends with pivotally mounted handles $119^a$ by which the rods may be turned. Said rods carry clamp-members 121 made adjustable upon said rods by having screw-threaded engagement therewith. Said clamp-members 121 (Fig. 29) are provided with clamping plates $121^a$, each mounted upon a stem $121^b$ having screw-threaded engagement with the clamping member 121. Said stem $121^b$ is provided with a handle, by which the clamp as a whole may be rigidly secured to the rod and the latter thereby prevented from turning.

A retaining screw 122 (Fig. 31) is provided, having an enlarged head in which is formed an annular groove 122ª, adapted to receive the lower forked extremity of the bracket 109. Said screw is adapted to be inserted in the stern of the craft and to be engaged by the lower end of the bracket 109, for holding the latter rigidly in position.

The object of the lateral arms 118 and the rods and clamps connected therewith, is to give additional support for the motor and the same may be clamped to the gunwales of the craft, on either side thereof. This form of supporting bracket is adapted equally well for flat or pointed stern boats or crafts.

From the foregoing description of my invention, it will be understood that when it is desired to raise or lower the propeller for the purpose of adjusting the same into the proper operative position in relation to the stern of the boat or for running in deep or shallow water, the bearing sleeve or tubular post, together with the tube which turns therein, and the engine and the gear case mounted on the upper and lower ends of said tube, are not only turned or oscillated for steering but are shifted up or down relatively to the supporting bracket, and clamped or held in any position of vertical adjustment, without in any way disturbing the connection of the engine with the transmission case or the driving connections between the engine and the propeller shaft. In this respect a marine motor embodying my invention differs from prior devices of similar character wherein the engine is rigidly attached to the boat and the gear transmission case and propeller shaft are turned relatively to the engine in steering the boat.

Another important advantage gained by the construction in which the gear case is rigidly attached to the engine frame or casing through the medium of a tube through which passes the driving shaft, is that in a construction wherein the engine turns with the propeller shaft in steering the craft, the rotative movement of the transmission case and propeller, in the steering of the craft, has no effect on the action of the engine in turning the driving shaft and propeller; it being obvious that in prior constructions in which the engine is fixed and the transmission case is oscillated relatively thereto for steering, the turning of the transmission case in one direction will act to retard the rotation of the propeller and in the other direction to accelerate such turning movement, according to the extent to which the transmission case and propeller shaft are so turned in steering. Manifestly, in my improved construction, the propeller shaft always maintains the same relation to the piston and crank shaft of the engine and the turning of the transmission case with the propeller shaft and the propeller has no effect whatsoever upon the operation of the engine.

A special advantage is gained by the construction described wherein the fuel tank is located above the fly wheel and said fuel tank is provided with a central opening into which the crank shaft extends, for the reason that by this construction the fly wheel is covered or protected. In prior constructions in which the fly wheel is unprotected and is provided with an attached crank or handle for starting the engine, the clothing of the operator or persons in the boat is very liable to be caught by the revolving fly wheel, with disastrous consequences.

The employment in connection with the gear case, of a vertical fin thereon, adapted to form a rudder, in a construction in which the gear cases and propeller shaft are turned or oscillated for steering the boat, has the important advantage that the boat may be steered equally well after the engine is stopped as well as when it is running. An important advantage is also gained by the horizontal fins on the gear case for the reason that the same not only serve to steady the boat but, in connection with the vertical fin, serve as guards for the propeller blades.

The construction hereinbefore described in the devices by which the air supplied for the explosive mixture is compressed in the crank case of the engine and delivered under pressure to the cylinder, in connection with an admission valve provided with fuel feeding and mixing or carbureting means, affords a simple and inexpensive construction for such devices, making them certain and simple in their operation and capable of being accurately regulated in their action, according to the amount of power required to be developed by the engine and other conditions.

The features of construction described in the throttle valve for controlling the air supply to the engine cylinder, and the connection of such throttle valve with the ignition timing mechanism also have the advantage of simplicity of construction and certainty in operation. The construction described in the centrifugal pump and means for driving the same from the propeller shaft has also the important advantage of affording a simple and economical construction in the means for supplying cooling water to the water jacket of the engine cylinder.

The supporting bracket described, in connection with the means shown for adjustably connecting the bearing sleeve of the motor with the same, together with the means associated with said bracket, by which the same may be clamped not only to the stern of the craft but to the sides or gunwales of the craft at points forward of the stern, have the advantages of enabling the said bracket to be strongly and firmly secured to crafts of various forms, while permitting convenient adjustment of the engine and transmission case as necessary for bringing the same into the desired position, regardless of the shape of the stern of the craft, and to be rigidly and strongly secured in position on the craft when so adjusted.

As hereinbefore set out, in steering the boat to which my device is attached, the engine frame, the gear case, the rudder, the propeller, and the other connected parts thereof are adapted to be rotated about a vertical axis by reason of the connection of the vertical tubular post 1 with the sleeve 108 pivotally secured to the bracket 109. In order to prevent the rotation of the engine frame and the connected parts in the cranking of the engine, a locking device is provided and constructed as follows: (see Figs. 3, 7 and 32). Integral with the sleeve 108 or otherwise secured thereto on the side of said sleeve facing the end of the boat to which my device is attached and adjacent the upper end of said sleeve is a radially projecting lug 200. Said lug 200 is in alinement with the keel of the boat when my device is attached thereto and is provided with an outwardly opening vertical locking slot 201. Secured to or formed integral with, and depending from the under side of the crank case 2 adjacent the sleeve 108 is a second lug or boss 202. Said boss 202 is secured to the crank case in such a position that it is brought above the lug 200 when the engine frame and its connected parts are in alinement with the keel of the boat. Said boss 202 is provided with a vertical recess or slot 203 in which is pivotally mounted, by means of a pivot bolt 204, a key or locking lever 205. Said pivot bolt 204 extends horizontally through said boss 202 and is provided at its end, projecting laterally from said boss, with an operating handle 206, by means of which said key is rotated to bring its free end either into or out of locking engagement with the locking slot 201. A flat spring 207 secured to said boss 202 in the recess 203 thereof bears at its free end against the inner end of said key 204 and maintains the key in either locked or unlocked position until turned from such position by the operation of said handle. When the key 204 is engaged in the locking slot 201, the rotation of the engine frame and its connected parts relatively to the sleeve 108 is prevented in the cranking of the engine. Moreover, when it is desired to steer the boat in a straight course, the engine frame and its connected parts may be locked in desired position by the locking means above described. The rudder having rigid connection with the engine frame will thus keep the boat on a straight course. When the key 204 is out of locking engagement with the slot 201, the engine frame and its connected parts may be rotated relatively to the sleeve 108 in steering the boat.

It is to be understood that I have illustrated in the accompanying drawings preferred or desirable forms of the several features constituting my invention and that I do not desire to be limited to the special forms of such features illustrated, except in so far as the same may be pointed out in the appended claims as constituting parts of my invention.

I claim as my invention:

1. An apparatus of the character described, comprising a non-rotatable bearing sleeve, a tube rotatively mounted within said bearing sleeve, a motor mounted at the upper end of said tube, a driven shaft within said tube in operative connection at its upper end with the said motor, a transmission case connected with the lower end of said tube, a propeller shaft journaled within said transmission case, a propeller mounted upon said propeller shaft, means within said transmission case affording driving connection between said driving and propeller shafts, and a supporting bracket adapted to be attached to a craft embracing a clamp member adapted to be clamped about said non-rotatable sleeve.

2. An apparatus of the character described, comprising a motor, a driving shaft having operative connection with said motor, a transmission case, a propeller shaft journaled within said transmission case, a propeller mounted upon said propeller shaft, means within said transmission case affording driving connection between said driving and propelling shafts, a vertical fin upon the transmission case constituting a rudder, and horizontal fins extending from opposite sides of said transmission case, said vertical and horizontal fins being arranged radially to the axis of rotation of said propeller shaft.

3. An apparatus of the character described, comprising a motor, a driving shaft having operative connection with said motor, a transmission case, a propeller shaft journaled within said transmission case, a propeller mounted upon said propeller shaft, gearing within said transmission case affording driving connection between said driving and propeller shafts, a vertical fin depending from said transmission case and adapted to form a rudder, and horizontal fins extending from the opposite sides of said transmission case and in the same plane with each other; said vertical and horizontal fins being radially disposed to the axis of rotation of said propeller shaft.

4. An apparatus of the character described, comprising a supporting bracket adapted to be attached to a craft, a non-rotatable bearing sleeve, a clamping member adapted to be clamped about said non-rotatable sleeve and having connection with said supporting bracket permitting angular adjustment of said bearing sleeve relative to said bracket in a vertical plane, a tube rotatively mounted within said sleeve, a motor rigidly mounted on the upper end of said tube, a driving shaft journaled within said tube and having operative connection at its upper end with the said motor, a transmission case rigidly secured to the lower end of said tube, a propeller shaft within said transmission case, a propeller mounted upon said propeller shaft, and means within said transmission case adapted to afford a driving connection between said driving and propeller shafts.

5. An apparatus of the character described, comprising a motor, a driving shaft having operative connection with said motor, a transmission case, a propeller shaft journaled within said transmission case, a propeller mounted on said propeller shaft, means within said transmission case affording driving connection between the driving and propelling shafts and including a clutch device adapted to be actuated to reverse the action of said propeller shaft, a shifting yoke mounted in said transmission case and adapted to slide therein in a direction axially of said propeller shaft, said yoke having operative connection with said clutch device, and means for operating said yoke.

6. A marine motor comprising a rotative tube, an internal combustion engine provided with a crank case which is rigidly secured to the upper end of said tube, and with a crank shaft extending above said crank case, a driving shaft journaled within said tube and connected at its upper end with said crank shaft, a fly wheel mounted upon the crank shaft of said engine above and adjacent to said crank case, a fuel tank supported upon the said engine adjacent to and above said fly wheel, a transmission case rigidly secured to the lower end of said tube, a propeller shaft journaled within said transmission case, a propeller rigidly mounted upon said propeller shaft, and gearing within said transmission case affording driving connection between said propeller and driving shafts.

7. A marine motor comprising a rotative tube, an internal combustion engine rigidly secured to the upper end of said tube, said engine embracing a crank case which is directly attached to the said tube and is provided with crank shaft bearings and with a crank shaft in axial alinement with said tube, a driving shaft journaled in said tube and having operative connection at its upper end with said crank shaft, a fly wheel mounted upon the said crank shaft above the crank case, a fuel tank mounted upon said engine above the fly wheel, and provided with an inner tubular wall forming an opening therethrough into which extends the upper end of the crank shaft, a transmission case rigidly secured to the lower end of said tube, a propeller shaft journaled in said transmission case, a propeller mounted upon said propeller shaft, and gearing in said transmission case affording driving connection between said driving and propeller shafts.

8. A marine motor, comprising a rotative tube, an engine mounted at the upper end of said tube, said engine being provided with a crank shaft and with a crank case, one end of said crank shaft extending into said tube, a driving shaft journaled in said tube and connected at its upper end with the said crank shaft, a fly wheel mounted upon the upper end of said crank shaft adjacent to the crank case, a fuel tank mounted above and covering said fly wheel, a transmission case at the lower end of said tube, a propeller shaft journaled within said transmission case, a propeller mounted upon said propeller shaft, and means in said transmission case affording driving connection between said driving and propeller shafts.

9. A marine motor comprising a rotative tube, an internal combustion engine rigidly secured to the upper end of said tube, said engine being provided with a crank case which is directly attached to said tube, and with a crank shaft journaled in said crankcase in axial alinement with said tube, a driving shaft in said tube connected at its upper end with said crank shaft, a fly wheel mounted upon said crank shaft above the crank-case, a timing mechanism mounted upon the crank shaft bearing above the crank case and between the same and said fly wheel, a fuel tank supported upon the engine above said fly wheel and provided with a central tube into which projects the upper end of said crank shaft, a transmission case rigidly secured to the lower end of said tube, a propeller shaft journaled in said transmission case, a propeller mounted upon said propeller shaft, and gearing in said transmission case affording driving connection between said driving and propeller shafts.

10. A marine motor comprising a rotative tube, an internal combustion engine, a driving shaft journaled within said tube and having operative connection at its upper end with said engine, a transmission case rigidly secured to the lower end of said tube, a propeller shaft journaled in said transmission case at an angle to said driving shaft, beveled gear wheels loosely mounted upon said propeller shaft within the transmission case, a beveled gear wheel rigidly secured to the lower end of said driving shaft and meshing with the beveled gear wheels on the propeller shaft, a clutch member mounted upon said propeller shaft between said gear wheels, said clutch member being axially movable and non-rotative relative to said propeller shaft, a shifting yoke mounted in said transmission case and adapted to slide therein in a direction axially of the propeller shaft, said yoke having operative connection with said clutch member, an upright shaft journaled in said transmission case and having operative connection with said yoke.

11. A marine motor comprising a rotative tube, an internal combustion engine, a driving shaft journaled within said tube and having operative connection at its upper end with said engine, a transmission case rigidly secured to the lower end of said tube, a propeller shaft journaled in said transmission case at an angle to said driving shaft, beveled gear wheels loosely mounted upon said propeller shaft within the transmission case, a beveled gear wheel rigidly secured to the lower end of said driving shaft and meshing with the beveled gear wheels on the propeller shaft, a clutch member mounted upon said propeller shaft between said gear wheels, said clutch member being axially movable and non-rotative relative to said propeller shaft, a shifting yoke mounted in said transmission case and adapted to slide therein in a direction axially of the propeller shaft, said yoke having operative connection with said clutch member, and being provided with side members parallel with the axis of said propeller shaft, and the transmission case being provided in its side walls with opposite guide grooves for engagement with the side members of said yoke, and an upright shaft journaled in said transmission case and having operative connection with said yoke.

12. A marine motor comprising a rotative tube, an internal combustion engine, a driving shaft journaled within said tube and having operative connection with said engine, a transmission case rigidly secured to the lower end of said tube, a propeller shaft journaled in said transmission case at an angle to said driving shaft, beveled gear wheels loosely mounted upon said propeller shaft within the transmission case, a beveled gear wheel rigidly secured to the lower end of said driving shaft and meshing with the beveled gear wheels on the propeller shaft, a clutch member mounted upon said propeller shaft between said gear wheels, said clutch member being axially movable and non-rotative relative to said propeller shaft, a shifting yoke mounted in said transmission case and adapted to slide therein in a direction axially of the propeller shaft, said yoke having operative connection with said clutch member, an upright shaft journaled in said transmission case and having operative connection with said yoke, said shaft passing through the upper wall of the transmission case and having bearing at its upper end on the casing of the engine, and manually operable means for giving oscillatory movement to said shaft.

13. A marine motor comprising a rotative tube, an internal combustion engine provided with a crank shaft, a driving shaft journaled within said tube and having operative connection at its upper end with said crank shaft, a transmission case rigidly secured to the lower end of said tube, a propeller shaft journaled within said transmission case, two beveled gear wheels loosely mounted upon said propeller shaft, a beveled gear wheel rigidly secured to the lower end of the driving shaft and meshing with both of said beveled gear wheels to rotate them in opposite directions, a clutch member slidably mounted upon said propeller shaft, non-rotative relative thereto, and located between said beveled gear wheels, a shifter yoke slidably mounted within said transmission case and engaged with said clutch member, an upright shaft journaled in the top wall of the transmission case and provided at its lower end with a crank arm engaging said yoke, and manually operable means for turning said shaft to effect the shifting of the clutch member.

14. A marine motor comprising a rotative tube, an internal combustion engine provided with a crank shaft, a driving shaft journaled within said tube and having operative connection at its upper end with the said crank shaft, a transmission case rigidly secured to the lower end of said tube, a propeller shaft journaled in said transmission case, beveled gear wheels loosely mounted upon said propeller shaft, a beveled gear wheel rigidly secured to the lower end of the driving shaft and meshing with said beveled gear wheels to rotate the same in opposite directions, a clutch member slidably mounted on said propeller shaft, non-rotative relative thereto, and located between said beveled gear wheels, a shifter yoke comprising side members having sliding engagement with the opposite side walls of the transmission case, said shifter yoke being engaged at one end with said clutch member and provided at its opposite end with a transverse portion extending over the shaft and provided with a transversely extending slot, an upright shaft journaled in the top wall of the transmission case and provided at its lower end with a crank arm, and with a pin on said crank arm engaging said slot, and manually operable means for rotating said shaft to effect the shifting movement of a yoke and clutch member.

15. A marine motor comprising a rotative tube, an internal combustion engine provided with a crank shaft, a driving shaft within said tube connected at its upper end with said crank shaft, a transmission case rigidly secured to the lower end of said tube, said transmission case being provided with an integral upwardly extending clamping sleeve adapted to receive the lower end of said tube, a propeller shaft journaled in said transmission case, and means within said transmission case, affording driving connection between said driving and propeller shafts.

16. A marine motor comprising a rotative tube, an internal combustion engine provided with a crank shaft, a driving shaft within said tube connected at its upper end with said crank shaft, a transmission case rigidly secured to the lower end of said tube, said case comprising upper and lower shell sections, one of said shell sections being provided with marginal integral outwardly extending horizontal fins, and the lower shell being provided with an integral downwardly extending vertical fin adapted to act as a rudder, a propeller shaft in said transmission case, and driving connections within said case between said driving and propeller shafts.

17. A marine motor comprising a rotative tube, an internal combustion engine provided with a crank shaft, a driving shaft journaled within said tube and having driving connection at its upper end with said crank shaft, a transmission case rigidly secured to the lower end of said tube, a propeller shaft journaled within said transmission case, a propeller mounted upon one end of said propeller shaft, a centrifugal pump comprising a pump casing attached to the said transmission case, a driving shaft for said pump journaled in said transmission case, a beveled gear wheel rigidly mounted upon the lower end of said driving shaft, two beveled gear wheels loosely mounted upon said propeller shaft, both meshing with said beveled gear wheel on the driving shaft, a shiftable clutch member mounted upon the propeller shaft between said gear wheels, and intermeshing beveled gear wheels, one of which is attached to the driving shaft of said pump, and the other of which is attached to one of said gear wheels on the propeller shaft.

18. An apparatus of the character described, comprising a bracket adapted to be attached to a craft, a motor supported by said bracket and provided with a crank-shaft, a driving shaft having operative connection with one end of said crank-shaft, a fly wheel mounted upon the other end of said crank-shaft, a fuel tank mounted above and covering said fly wheel, a propeller shaft, a propeller mounted upon said propeller shaft, and means affording driving connection between said driving and propeller shafts.

19. A marine motor comprising a rotative tube, an internal combustion engine provided with a crank shaft, a driving shaft journaled within said tube and having operative connection at its upper end with said crank shaft, a transmission case rigidly secured to the lower end of said tube, a propeller shaft journaled within said transmission case, two beveled gear wheels loosely mounted upon said propeller shaft, a beveled gear wheel rigidly secured to the lower end of the driving shaft and meshing with both of said beveled gear wheels to rotate them in opposite directions, a clutch member slidably mounted upon said propeller shaft, non-rotative relative thereto, and located between said beveled gear wheels, a shifter yoke slidably mounted within said transmission case to engage with said clutch member, an upright shaft journaled in the top wall of the transmission case and provided at its lower end with a crank arm engaging said yoke, a manually operable control lever pivoted upon said engine, and connecting means between said control lever and said shaft, whereby the latter is oscillated by the movement of said control lever.

20. A marine motor comprising a bracket adapted for attachment to a craft, a bearing sleeve, means adjustably connecting said bearing sleeve with said bracket, adapted to afford both endwise and angular adjustment of the bearing sleeve relative to the bracket, said means including a clamping sleeve pivoted to the bracket and surrounding said bearing sleeve, a tube rotatively mounted within said bearing sleeve, an internal combustion engine rigidly mounted on the upper end of said tube, a driving shaft within said tube, in operative connection at its upper end with the engine, a transmission case rigidly mounted upon the lower end of said tube, a propeller shaft journaled within said transmission case, and gearing within the transmission case affording driving connection between said driving and propeller shafts.

21. A marine motor comprising an internal combustion engine, a bearing sleeve, a tube rotatively mounted in said bearing sleeve, a driving shaft rotatively mounted in said tube and having operative connection at its upper end with the engine, a transmission case rigidly attached to the lower end of said tube, a propeller shaft journaled in said transmission case, a supporting bracket adapted for attachment to a craft, an upper clamping sleeve pivoted to the said bracket and adapted to swing on a horizontal axis, said clamping sleeve surrounding said bearing sleeve near its upper end, and in which said bearing sleeve is adjustable endwise, a lower clamping sleeve which surrounds said bearing sleeve, and in which said bearing sleeve has endwise adjustment, and connecting links pivoted to the lower part of said bracket and to the said lower clamping sleeve.

22. The combination of a bearing sleeve, a tube rotatively mounted in said bearing sleeve, an internal combustion engine rigidly attached to the upper end of said tube, a driving shaft rotatively mounted in said tube, a transmission case rigidly attached to the lower end of said tube, a propeller shaft journaled in said transmission case, a vertically extending bracket adapted for attachment to the stern of a craft, means for clamping the upper part of said bracket to the craft, an upper clamping sleeve pivoted to the bracket, said clamping sleeve surrounding and having endwise adjustment relatively to said bearing sleeve, a lower clamping sleeve surrounding and adapted for endwise adjustment relatively to said bearing sleeve, and links pivoted to the lower part of said bracket and to the lower clamping sleeve.

23. A supporting bracket for connecting a motor with a craft, comprising a main bracket member, means for clamping said main bracket member to the stern of the craft, said bracket member being provided with rigid, laterally extending arms, and two lateral clamping members extending forwardly from said arms and connected therewith by universal joints, the forward ends of said clamping members being provided with means for clamping the same to the sides of the craft at points forward from its stern.

24. As a means for attaching a marine engine to the stern of a craft, a supporting bracket provided with clamping means adapted for engagement with the stern of the craft and provided with laterally extending arms, rods connected with the outer ends of said arms by universal joints, and clamping means on the forward ends of said arms.

25. As a means for attaching a marine engine to the stern of a craft, a supporting bracket provided with clamping means adapted for engagement with the stern of the craft and provided with laterally extending arms, rods connected with the outer ends of said arms by universal joints and clamping means having endwise adjustable connection with the forward ends of said rods.

26. As a means for attaching a marine engine to the stern of a craft, a supporting bracket provided with clamping means and with laterally extending rigid arms, rotative rods, connected by universal joints and swivels with the outer ends of said laterally extending arms, and clamping devices having screw-threaded engagement with the forward ends of the said rods.

27. As a means for attaching a marine engine to the stem of a craft, a supporting bracket, a clamp-supporting arm pivoted to the upper end of the said bracket and extending forwardly therefrom, a clamp-carrying member adapted to slide endwise on said clamp-supporting arm, means for adjustably securing said clamp-carrying member to said clamp-carrying arm, and a clamping member having screw-threaded engagement with said clamp-carrying member.

28. As a means for attaching a marine engine to the stern of a craft, a supporting bracket, a clamp-supporting arm pivoted to the upper end of the said bracket, adjusting means for rigidly holding said clamp supporting arm in a definite angular relation to said bracket, a clamp-carrying member adapted to slide endwise on said clamp-supporting arms, means for locking said clamp-carrying member to said arm, and a clamping member having screw-threaded engagement with said clamp-carrying member.

29. As a means for attaching a marine engine to the stern of a craft, a supporting bracket, a clamp-supporting arm extending forwardly from said bracket and provided with holding notches, a clamp-carrying member slidably mounted on said arm and provided with a movable member adapted to engage either one of said notches, and a clamping member having screw-threaded engagement with said clamp-carrying member.

30. As a means for attaching a marine engine to the stern of a craft, a supporting bracket provided with laterally extending rigid arms, a clamp-supporting arm pivoted to the upper part of said bracket and extending forwardly therefrom, clamping means having endwise sliding and adjustable connection with said clamp supporting arm, rods connected by universal joints with the outer ends of said laterally extending arms, and clamping devices mounted on the forward ends of the said rods.

31. A marine motor, comprising a bracket adapted for attachment to a craft, a non-rotatable bearing sleeve, a clamping member adapted to be clamped about said non-rotatable sleeve and having connection with said bracket, permitting angular adjustment of said sleeve relative to said bracket in a vertical plane, a tube rotatively mounted within said bearing sleeve, an engine rigidly mounted on the upper end of said tube, a driving shaft within said tube in operative connection at its upper end with said engine, a transmission case mounted upon the lower end of said tube, a propeller shaft journaled within said transmission case, means within said transmission case affording driving connection between said driving and propeller shafts, and a tiller attached to said engine, said tiller having its forward end laterally offset from the axis on which the said tube and the attached engine turn or rotate.

32. A marine motor comprising a bracket adapted for attachment to a craft, a bearing sleeve, means adjustably connecting said bearing sleeve with said bracket, adapted to afford both endwise and angular adjustment of the bearing sleeve relatively to the bracket, said means including a clamping sleeve surrounding said bearing sleeve, a tube rotatively mounted within said bearing sleeve, an internal combustion engine rigidly mounted on the upper end of said tube and provided with a gear case, and a crank-shaft mounted in said crank case, a driving shaft within said tube in operative connection at its upper end with said crank shaft, a transmission case rigidly mounted upon the lower end of said tube, a propeller shaft journaled within said transmission case, gearing within the transmission case affording driving connection between said driving and propeller shafts, a fly wheel mounted on said crank shaft above the crank case, a fuel tank mounted on the engine above the fly wheel and provided with a vertical, tubular wall forming an opening through the fuel tank into which the upper end of the crank shaft extends, and a crank for starting the engine provided with a hub adapted for detachable connection with the crank shaft at a point within the said opening through the fuel tank.

33. A marine motor, comprising a bracket adapted for rigid attachment to a craft, a tube supported by and rotatively mounted within said bracket, a motor mounted to turn with said tube, a propeller shaft supported by said tube, a propeller on said propeller shaft, means providing driving connection between said propeller shaft and said motor, and means adapted to positively lock the motor casing to said bracket, so as to hold the motor casing against movement about a vertical axis, embracing a member on said bracket adapted to have locking engagement with a member on said motor casing.

34. An apparatus of the character described, comprising a bracket adapted to be attached to a craft, a tube supported by and rotatively mounted in said bracket, a motor mounted to turn with said tube, a transmission case attached to said tube, a propeller shaft journaled within said transmission case, a propeller mounted upon said propeller shaft, means providing driving connection between said propeller shaft and said motor, a stationary lug on said bracket, an arm pivotally mounted on said motor and adapted to be swung into and out of locking engagement with said lug for locking said motor and tube against turning relatively to said bracket.

35. As a means for attaching a marine motor to a craft, a supporting bracket provided with clamping members adapted for engagement with said craft, said bracket being provided with a depending arm adapted for contact with the body of the craft, and a retaining member adapted for permanent attachment to said craft and adapted to be engaged by the lower end of said arm, for holding the latter from both outward and lateral movement.

In testimony that I claim the foregoing as my invention I affix my signature in the presence of two witnesses, this 20th day of January, A. D. 1913.

EUGENE BIVERT.

Witnesses:
EUGENE C. WANN,
CHARLES H. POOLE.